Patented Dec. 14, 1926.

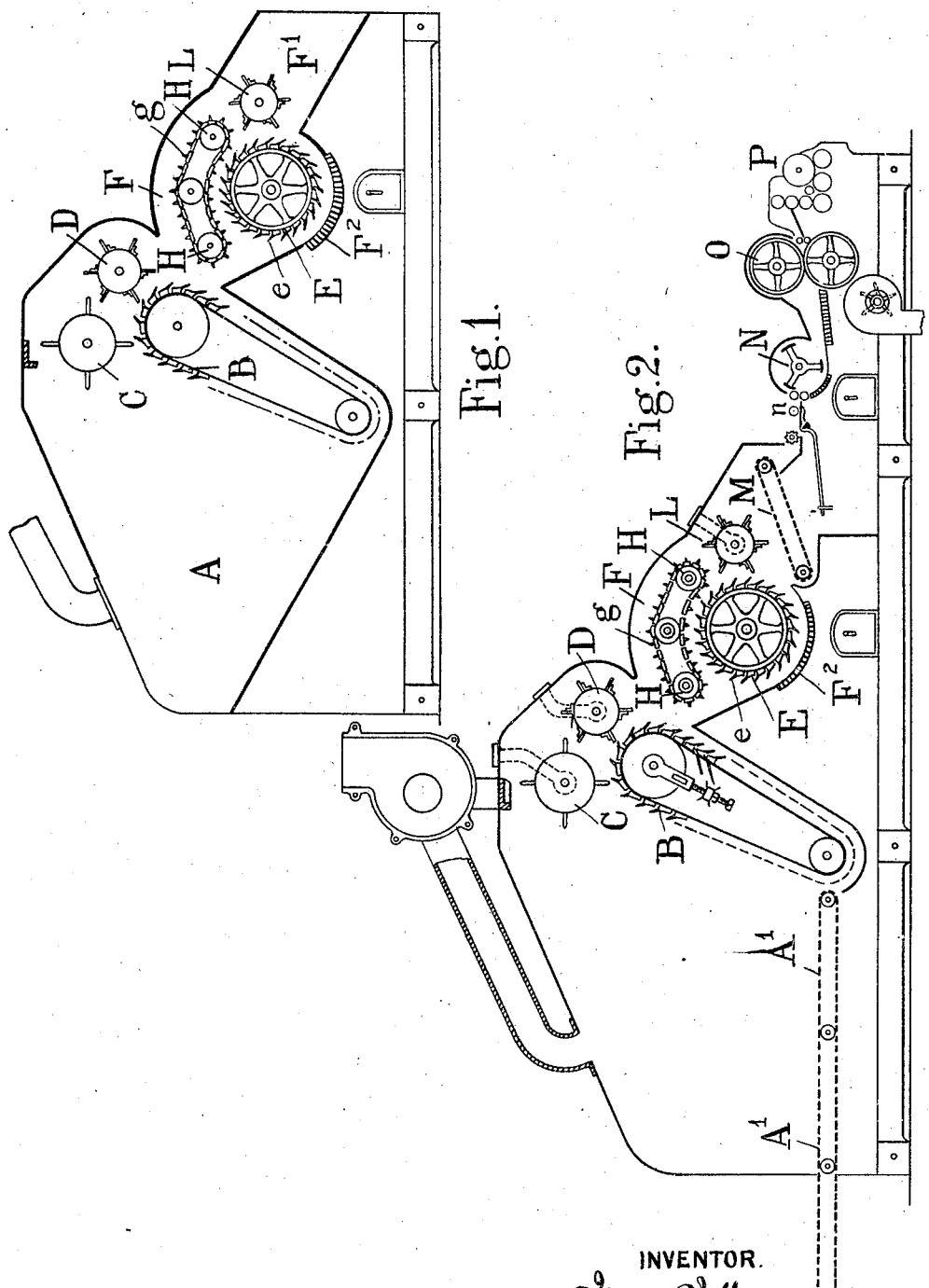

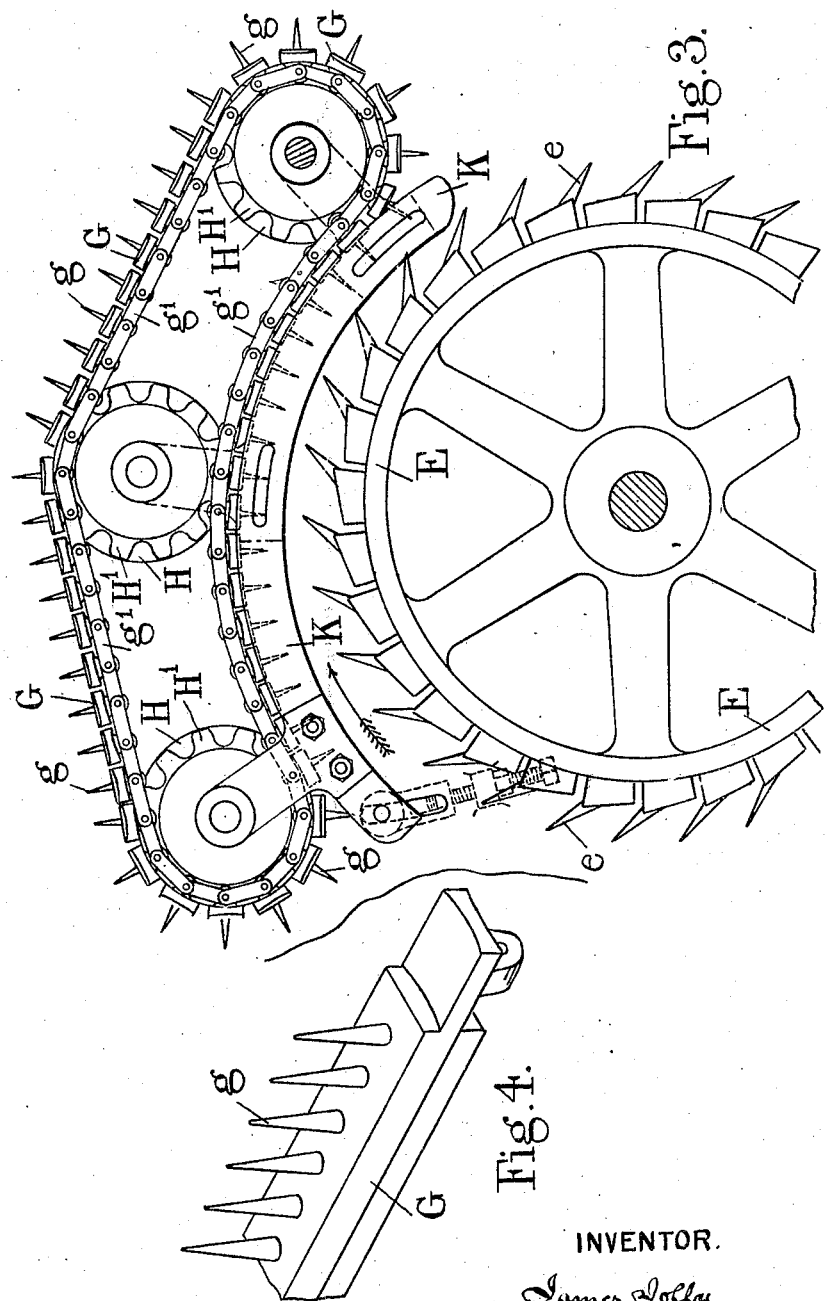

1,610,791

UNITED STATES PATENT OFFICE.

JAMES JOLLY, OF BOLTON, ENGLAND.

OPENER FOR COTTON AND OTHER FIBERS.

Application filed March 12, 1926. Serial No. 94,269.

This invention relates to apparatus for opening or separating raw fibers such as cotton, wool or the like known as hopper bale breakers or openers and other machines for similar purposes.

These machines are usually constructed with a hopper to receive the raw fibers, an inclined travelling spiked lattice to pick up the fibers from the hopper, a rotary evener roll to remove and throw back into the hopper unopened tufts of fibers from the spikes of the lattice and a rotary clearer roll to clear the opened fibers from the spikes and throw them forward.

Such machines however have the disadvantage that they allow an appreciable percentage of hard or unopened tufts to pass through without being opened.

The object of the present invention is to overcome this defect and at the same time obtain a greater production in the machine.

It consists in the combination with the well known parts of the machine of a revolving cylinder or drum having spikes on the periphery thereof to which the fibers pass from the inclined lattice and a series of travelling spiked bars arranged above the cylinder the distance of these bars from the cylinder being adjustable.

The invention will be described with reference to the accompanying drawings.

Fig. 1 is a side view of a bale opener with the invention applied thereto.

Fig. 2 is a side view of a combined bale opener, and scutcher with the invention applied thereto.

Fig. 3 is a detail view of the spiked cylinder or drum and the travelling spiked bars.

Fig. 4 is a detail perspective view of one of the travelling spiked bars.

The bale opener shown in Fig. 1 is constructed with the usual feed hopper A, inclined travelling spiked lattice B, spiked roller C for returning unopened tufts to the feed hopper and the revolving stripper D for removing the fibers from the spiked lattice C.

A revolving cylinder or drum E is arranged in the delivery hopper F and this cylinder or drum E is provided on its periphery with spikes $e$ which may be fixed directly on the cylinder or carried on bars $e^1$ attached thereto. The spikes $e$ may be of any desired size and set at any desired distance apart according to the class of cotton being treated.

The spikes $e$ are set at a forward angle so that they will pick up and carry forward the cotton delivered from the bale breaker.

Cleaning bars $F^2$ are arranged below the spiked cylinder E through which any dirt released from the fibers whilst being acted upon by the spiked cylinder will fall.

A travelling lattice formed of bars G on which are affixed spikes $g$ is arranged above the spiked cylinder E to work in conjunction therewith. The bars G are joined by links $g^1$ to form an endless lattice which is positively driven by coming into contact with the pulleys H and sprocket wheels $H^1$ one or more of which is driven, the ends of the bars G being designed to rest on the pulley H.

In order that the lower side of the lattice may follow the desired curved path in relation to the periphery of the cylinder E, bends K are arranged above the cylinder with which the ends of the bars G come into contact.

The pulleys H and sprocket wheels $H^1$ and the bends K are preferably adjustable in a radial direction relative to the cylinder E to allow of the bars G being adjusted to give any desired distance between the spikes on the bars and the spikes on the cylinder E as may be required for different classes of cotton. The bends K may be arranged somewhat eccentric in relation to the cylinder E so that the spikes are further apart at the end nearest the delivery from the inclined lattice B and their distance apart gradually decreases towards the other end. This arrangement is illustrated in the detail view shown in Fig. 3.

The bars G travel in the same direction as the cylinder E this direction being indicated by the arrow in Fig. 3 but only at a sufficient speed to take the delivery from the inclined spiked lattice B, whilst the cylinder E rotates at a faster speed, the ratio between the two speeds regulates the amount of opening of the cotton. The difference in speed between the bars G and the periphery of the cylinder E causes the combing or opening out of any hard tufts of fibers coming from the inclined lattice B.

The spikes $g$ on the bars G are preferably arranged at right angles to the bars as shown in Fig. 4 so that during their passage along the bends K they will at first assume a forward angle and gradually as they near the center take up a straight position and give more hold in the cotton and then as they pass towards the end they take up a position having an angle towards the cotton thereby ensuring that no hard tufts will pass. This gradual holding of the cotton ensures a gentle treatment of the fibers.

The opened cotton from the cylinder E is delivered by the stripper L to the delivery hopper $F^1$.

In the form of the invention shown in Fig. 2 it is employed in conjunction with a bale opener and a scutcher or other lap device so that it is delivered in lap form. The cotton is fed to the inclined spiked lattice B by a horizontal travelling lattice $A^1$ instead of by a hopper and it is delivered from the spiked cylinder E on to a travelling lattice M which carries it to the feed rollers $n$ of a beater N where it receives a further opening and cleaning treatment. It then passes between a pair of cages O to form it into a fleece and from thence it passes to the lap rollers P.

What I claim as my invention and desire to protect by Letters Patent is:

1. In apparatus for opening raw fibers the combination with an inclined spiked lattice of a rotary cylinder, spikes on the periphery thereof, a travelling lattice and spikes thereon working in conjunction with the spikes on the cylinder.

2. In apparatus for opening raw fibers the combination with an inclined spiked lattice of a rotary cylinder, spikes on the periphery thereof, a series of travelling bars, links connecting said bars together and spikes carried by said bars co-operating with the spikes on the rotary cylinder.

3. In apparatus for opening raw fibers the combination with an inclined spiked lattice of a rotary cylinder, spikes on the periphery thereof, a series of travelling bars, links connecting said bars together, spikes carried by said bars co-operating with the spikes on the rotary cylinder and links connecting said bars together to form a travelling lattice.

4. In apparatus for opening raw fibers the combination with an inclined spiked lattice of a rotary cylinder, spikes on the periphery thereof, a series of travelling bars, links connecting said bars together, spikes carried by said bars co-operating with the spikes on the rotary cylinder, links connecting said bars together to form a travelling lattice, and adjustable sprocket wheels and pulleys over which the bars pass.

5. In apparatus for opening raw fibers the combination with an inclined spiked lattice of a rotary cylinder, spikes on the periphery thereof, a series of travelling bars, links connecting said bars together, spikes carried by said bars co-operating with the spikes on the rotary cylinder, links connecting said bars together to form a travelling lattice, adjustable sprocket wheels and pulleys over which the bars pass and adjustable bends to guide the path of the bars in relation to the periphery of the cylinder.

6. In apparatus for opening raw fibers the combination with an inclined spiked lattice of a rotary cylinder, spikes on the periphery thereof, a series of travelling bars, links connecting said bars together, spikes carried by said bars co-operating with the spikes on the rotary cylinder, links connecting said bars together to form a travelling lattice, adjustable sprocket wheels and pulleys over which the bars pass, adjustable bends to guide the path of the bars in relation to the periphery of the cylinder, a travelling lattice to convey the raw fibers to the inclined spiked lattice, a travelling lattice to receive the fibers from the cylinder, a beater, a pair of cages and a lap forming device so that the fibers are delivered from the machine in the form of a lap.

In testimony whereof I have hereunto set my hand.

JAMES JOLLY.